United States Patent
Bharadwaj et al.

(10) Patent No.: US 11,250,602 B2
(45) Date of Patent: *Feb. 15, 2022

(54) GENERATING CONCEPT IMAGES OF HUMAN POSES USING MACHINE LEARNING MODELS

(71) Applicant: International Business Machines Corporation, Armonk, NY (US)

(72) Inventors: Samarth Bharadwaj, Bangalore (IN); Saneem Chemmengath, Bangalore (IN); Suranjana Samanta, Bangalore (IN); Karthik Sankaranarayanan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/137,651

(22) Filed: Dec. 30, 2020

(65) Prior Publication Data

US 2021/0118206 A1  Apr. 22, 2021

Related U.S. Application Data

(63) Continuation of application No. 16/548,388, filed on Aug. 22, 2019, now Pat. No. 10,930,032.

(51) Int. Cl.
*G06T 11/20* (2006.01)
*G06N 20/00* (2019.01)
(Continued)

(52) U.S. Cl.
CPC .......... *G06T 11/20* (2013.01); *G06K 9/00335* (2013.01); *G06K 9/6256* (2013.01);
(Continued)

(58) Field of Classification Search
CPC ........................... G06N 20/00; G06K 9/00335
See application file for complete search history.

(56) References Cited

U.S. PATENT DOCUMENTS

| | | |
|---|---|---|
| 2009/0016599 A1 | 1/2009 | Eaton et al. |
| 2013/0091453 A1 | 4/2013 | Kotler et al. |
| (Continued) | | |

FOREIGN PATENT DOCUMENTS

| | | |
|---|---|---|
| CN | 109300178 A | 1/2019 |
| KR | 1020130059035 A | 6/2013 |

OTHER PUBLICATIONS

List of IBM Patents or Patent Applications Treated as Related.
(Continued)

*Primary Examiner* — Phi Hoang
(74) *Attorney, Agent, or Firm* — Ryan, Mason & Lewis, LLP

(57) ABSTRACT

Methods, systems, and computer program products for generating concept images of human poses using machine learning models are provided herein. A computer-implemented method includes identifying events from input data by applying a machine learning recognition model to at least a portion of the input data, wherein the identifying comprises (i) detecting multiple entities from the input data and (ii) determining behavioral relationships among at least a portion of the multiple entities; generating, using a machine learning interpretability model and at least a portion of the identified events, images illustrating human poses related to at least a portion of the identified events; outputting at least a portion of the generated images to a user; and updating the machine learning recognition model based at least in part on (i) at least a portion of the generated images and (ii) input from the user.

14 Claims, 7 Drawing Sheets

(51) Int. Cl.
    *G06T 7/70*             (2017.01)
    *G06K 9/00*             (2006.01)
    *G06K 9/62*             (2006.01)

(52) U.S. Cl.
    CPC ........... *G06K 9/6263* (2013.01); *G06N 20/00* (2019.01); *G06T 7/70* (2017.01); *G06T 2207/20081* (2013.01); *G06T 2207/30196* (2013.01)

(56) References Cited

U.S. PATENT DOCUMENTS

| | | | |
|---|---|---|---|
| 2015/0161147 | A1 | 6/2015 | Zhao et al. |
| 2017/0202002 | A1* | 7/2017 | Han .................. H04Q 9/00 |
| 2018/0130496 | A1 | 5/2018 | Mahapatra et al. |
| 2018/0181802 | A1 | 6/2018 | Chen et al. |
| 2019/0279382 | A1 | 9/2019 | Jiang et al. |
| 2019/0286950 | A1 | 9/2019 | Kiapour et al. |
| 2019/0294871 | A1 | 9/2019 | Vaezi Joze et al. |
| 2019/0304076 | A1 | 10/2019 | Nina Paravecino et al. |
| 2019/0304157 | A1* | 10/2019 | Amer .................. G06N 3/0454 |
| 2020/0019419 | A1* | 1/2020 | Yada .................. G06F 16/9535 |
| 2020/0090001 | A1 | 3/2020 | Zargahi et al. |
| 2020/0167715 | A1 | 5/2020 | Bhatt et al. |

OTHER PUBLICATIONS

Wikipedia, DeepDream, https://en.wikipedia.org/w/index.php?title=DeepDream&oldid=907632367, Jul. 24, 2019.
Nagarajan et al., Attributes as Operators: Factorizing Unseen Attribute-Object Compositions, ECCV, Mar. 2018.
Wikipedia, Quick, Draw!, https://en.wikipedia.org/w/index.php?title=Quick,_Draw!&oldid=904009142, Jun. 29, 2019.
Ribeiro et al., "Why Should I Trust You?" Explaining the Predictions of Any Classifier, 2016.

* cited by examiner

GENERATING CONCEPT IMAGES OF HUMAN POSES USING MACHINE LEARNING MODELS

FIELD

The present application generally relates to information technology and, more particularly, to image creation technologies.

BACKGROUND

Conventional interpretability approaches are local in nature, typically highlighting specific parts of an image which contribute towards a classification task of the image. However, such approaches generally fail to determine and/or learn relationships between objects in the image, or to identify and/or determine a global concept of the image.

SUMMARY

In one embodiment of the present invention, techniques for generating concept images of human poses using machine learning models are provided. An exemplary computer-implemented method can include identifying one or more events from input data by applying a machine learning recognition model to at least a portion of the input data, wherein the identifying comprises (i) detecting multiple entities from the input data and (ii) determining one or more behavioral relationships among the multiple entities in the input data. Such a method also includes generating, using a machine learning interpretability model and at least a portion of the identified events, one or more images illustrating one or more human poses related to the identified events, and outputting at least a portion of the one or more generated images to at least one user. Additionally, such a method includes updating the machine learning recognition model based at least in part on (i) at least a portion of the one or more generated images and (ii) input from the at least one user.

In another embodiment of the invention, an exemplary computer-implemented method includes training a machine learning recognition model using data pertaining to human pose structures and image texture information, and identifying one or more events from input data by applying the machine learning recognition model to the input data, wherein the identifying comprises (i) detecting multiple entities from the input data and (ii) determining one or more behavioral relationships among at least a portion of the multiple entities. Such a method also includes generating, using a machine learning interpretability model and at least a portion of the identified events, one or more images illustrating one or more human poses related to at least a portion of the identified events, and outputting, via a dialog system, the one or more generated images to at least one human user. Further, such a method includes automatically producing at least one machine-originated image representative of the one or more generated images based at least in part on feedback from the at least one human user, and updating the machine learning recognition model based at least in part on the at least one machine-originated image.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
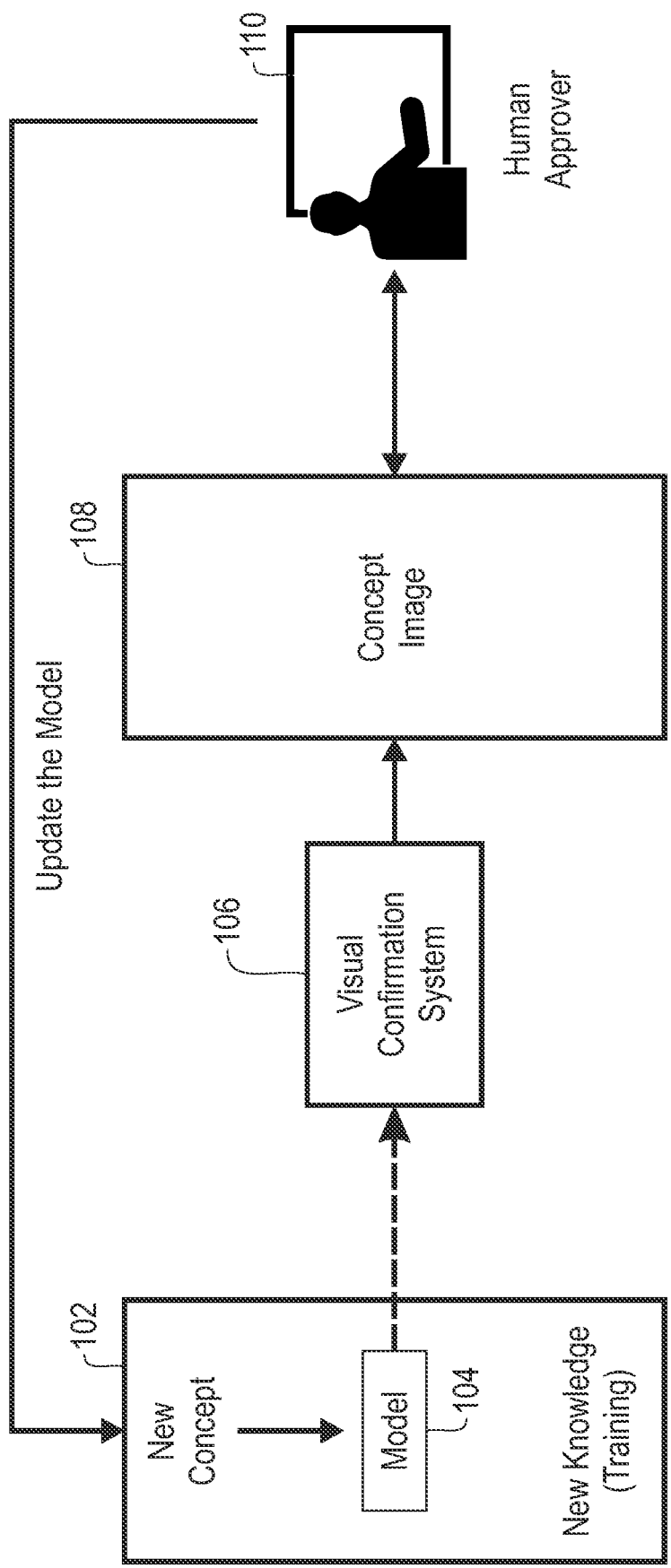
FIG. 1 is a diagram illustrating system architecture, according to an exemplary embodiment of the invention.

As described herein, an embodiment of the present invention includes generating concept images of human poses using machine learning models. At least one embodiment includes generating visual concept images of human poses for higher-order concepts of human behavior. In contrast to conventional approaches for model interpretability, one or more embodiments include using multimodal descriptions as input to generate the concept images. Such an embodiment includes using a multimodal machine learning algorithm, which learns a generalized concept of one or more higher-order human behaviors and produces one or more visual concept images. Such higher-order and/or generalized concepts are defined as concepts which identify multiple entities and relationships between them.

At least one embodiment includes implementing a generation model which is pre-trained to create stick figures which represent human poses, wherein the model is image-based, text-based, or multimodal. Such an embodiment includes providing an input to an interpretation pipeline with a pre-trained stick figure generator, wherein an interpretability model generates various human poses. Additionally, in such an embodiment, a multimodal machine learning algorithm learns a generalized concept of a higher-order concept to generate a set of training images. As noted above and herein, an interpretation pipeline can include a model or a series of modules which can be artificial intelligence-(AI-) based, non-AI-based, or mixed. In at least one embodiment, an interpretation pipeline includes a diagnostic or evaluation module separate from the actual/primary model (which may be image-based, text-based, or multimodal). In such an embodiment, a purpose of the interpretation model is to confirm, by generating visually consistent scenes via stick figures, that the actual/primary model has understood the concept correctly.

One or more embodiments include using a vector representation of a human pose (learnt by a machine learning model) and converting the vector to one or more human pose representations over one or more stick figures. In such an embodiment, a human user can subsequently interpret the one or more stick figures and confirm the accuracy of the machine learning model output. Accordingly, at least one embodiment includes generating images of human poses by enabling the model to manipulate the pose of the stick figure(s) and create an image that is indicative (to a human) of a given concept.

As used herein, an interpretability model provides some provision to indicate the reason for a decision, such as the presence of correlated attributes and/or a sequence of steps. By way merely of example, one instance of an interpretability model can include one or more decision trees. As also used herein, an explainability model justifies a decision by providing human-interpretable evidence in a feature space. By way of example, with image/vision data or text data, such evidence can include feature weight maps and/or heat maps (generated, for example, via guided backpropagation techniques, gradient-weighted class activation mapping techniques, etc.). Additionally, as used herein, concepts in the visual domain generally refer to colors, shapes, actions, etc., and higher-order concepts are defined via learning and/or understanding across data points.

FIG. 1 is a diagram illustrating system architecture, according to an embodiment of the invention. By way of illustration, FIG. 1 depicts a new knowledge (training) component 102, which applies model 104 (e.g., a machine learning model) to a new concept (i.e., input data pertaining to one or more human poses and/or behaviors). The output of model 104 is at least one image, which is provided to a visual confirmation system 106. Upon a positive determination and/or approval by the visual confirmation system 106, the model output is deemed a concept image 108 and is output by the visual confirmation system 106 to a human approver 110 for analysis. Upon approval by the human approver 110, the model 104 is updated based on the concept image 108. As noted above, the visual confirmation system 106 is another term for an interpretation pipeline (detailed herein). Accordingly, the visual confirmation pipeline (which can be one or more modules with AI components) is a diagnostic or evaluation module separate from the actual/primary model 104 (which may be image-based, text-based, or multimodal). As noted herein, a purpose of the visual confirmation system 106 is to confirm, by generating visually consistent scenes via stick figures, that the model 104 has understood a concept correctly.

In an example embodiment such as depicted in FIG. 1, the model 104 performs concept detection using pre-trained entity generation tools. The concept detected by the model 104 can be expressed in one or more suitable forms, and output as an image or series of images (e.g., concept image 108) that are subsequently presented to an end-user and/or human annotator (e.g., human approver 110) for confirmation and/or validation.

Figure 2:
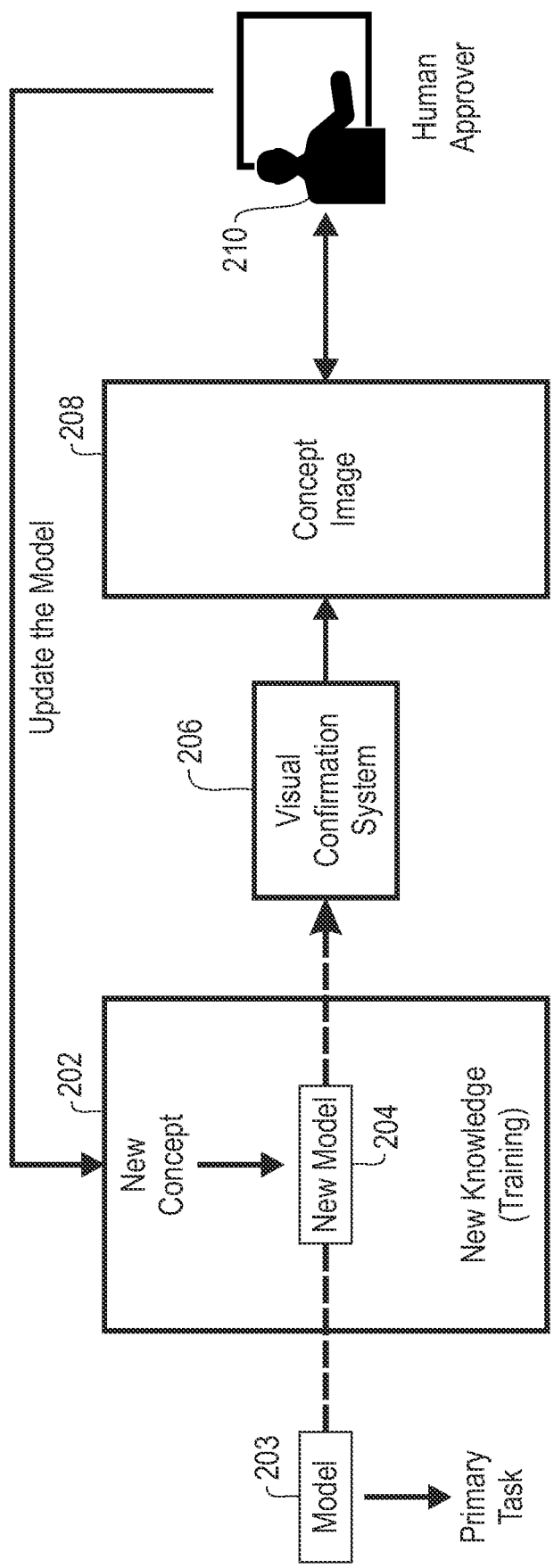
FIG. 2 is a diagram illustrating system architecture, according to an exemplary embodiment of the invention.

FIG. 2 is a diagram illustrating system architecture, according to an exemplary embodiment of the invention. By way of illustration, FIG. 2 depicts a model 203 (e.g., a machine learning model), which is applied to input data and outputs an identified and/or determined primary task. Additionally, FIG. 2 depicts a new knowledge (training) component 202, which updates model 203, thereby creating a new model 204, using a new concept (i.e., input data pertaining to one or more human poses and/or behaviors). The output of model 204 is at least one image, which is provided to visual confirmation system 206. Upon a positive determination and/or approval by the visual confirmation system 206, the model output is deemed a concept image 208 and is output by the visual confirmation system 206 to a human approver 210 for analysis. Upon approval by the human approver 210, the model 204 can be further updated based on the concept image 208.

Accordingly, at least one embodiment includes providing visual interpretability of higher-order (human pose and/or behavior) concepts. Such an embodiment includes utilizing a paradigm of image retrieval and/or generation for visual imaging of the concepts. In one or more embodiments, pre-trained models with pose structure and texture of images (such as, for example, stick figures) are used for image generation. Higher-order concepts often require many words to describe spatial aspects via text; however, one or more embodiments include encompassing spatial configurations in one or more images.

As detailed herein, at least one embodiment includes implementing one or more machine learning models to learn higher-order concepts from input data. As also noted herein, higher-order concepts include those that require identifying multiple entities and relationships between them (e.g., sports including multiple players, a playing surface, multiple items of playing equipment, etc.).

In one or more embodiments, a (machine learning) generation model is pre-trained to create stick figures representative of human poses. In such an embodiment, the human pose-to-stick figure model can include a fully generative model and/or image retrieval from a corpus. As an example, in such an embodiment, an event recognition model can be trained to learn and/or understand various events pertaining to human poses and/or human behaviors. Such a model can be image-based, text based, or multimodal. Also, in such an embodiment, the model is passed, as input, to a proposed interpretation pipeline with a pre-trained stick figure generator. The interpretability model then generates various human poses (illustrated via stick figures), and the visualized stick figures of concepts are provided to one or more end-users for confirmation and/or validation that the model is accurate and/or not biased.

Figure 3:
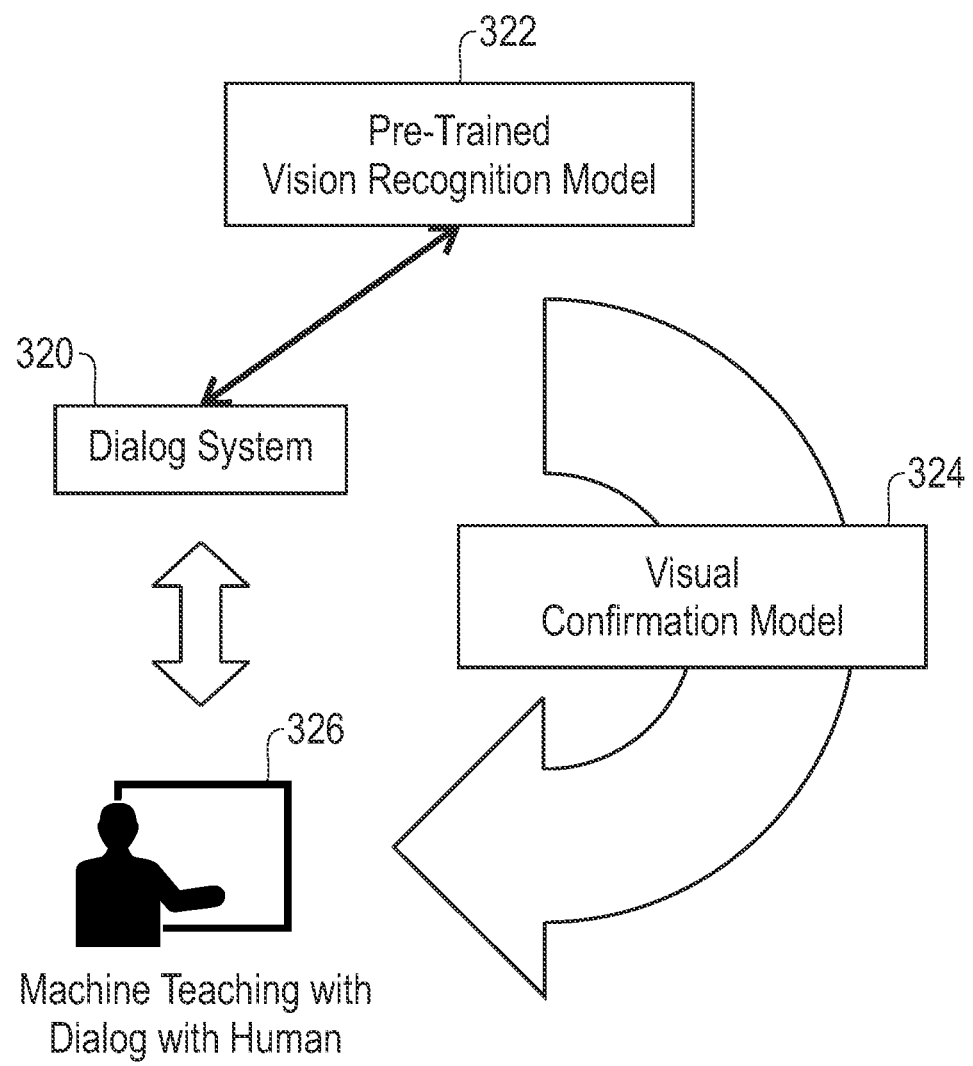
FIG. 3 is a diagram illustrating active learning and machine teaching, according to an exemplary embodiment of the invention.

FIG. 3 is a diagram illustrating active learning and machine teaching, according to an exemplary embodiment of the invention. By way of illustration. FIG. 3 depicts an embodiment that includes active teaming and machine teaching. In such an embodiment, a visual confirmation model 324 generates a stick figure collage to confirm the understanding of specific human behavior(s). As also depicted in FIG. 3, such an embodiment includes utilizing a pre-trained visual recognition system 322 that is built on various modules of predicted sub-tasks. Such an embodiment also includes utilizing a machine teaching scenario 326, which includes using a dialog system 320 to interact with a human teacher and/or approver to understand and/or confirm higher-order visual concepts. In such an embodiment, the dialog system 320 is used to understand higher-order-encompassing concepts from known lower-order concepts related to human behavior(s). Additionally, in at least one embodiment, the visual confirmation model 324 is constrained to generate stick figures of humans (and human poses and/or behaviors). Based on the dialog with the human teacher (e.g., the machine teaching scenario 326), the visual confirmation model 324 learns at least one concept and confirms this knowledge with at least one machine-generated image.

Also, one or more embodiments include image generation using white box multimodal settings. A white box model, as used herein, refers to an AI model which allows access to its internal workings and/or components. For example, one such white box model can include a neural network that provides access to intermediate layers and/or representations. A goal of such an embodiment includes creating images that confirm a higher-order understanding of visual concepts related to human poses and/or behavior(s). In at least one such embodiment, images of specific (new) pose concepts are input to a multimodal learning model, which outputs a primary task and one or more generalized images that confirm the concept.

Further, in such an embodiment, a pre-trained human pose estimation component, in connection with the multimodal learning model, computes join positions and gaze determine poses. The multimodal learning model then generalizes over specific instances of pose estimation that are labeled as a single higher-order concept (such as, for example "group exercise classes"). The multimodal machine learning algorithm (used as part of the model) attempts to learn a generalized concept of this higher-order concept. Additionally, a visual confirmation model uses the intermediary representation of the base model and generates concept images to generalize the concept images (such as, for example, depicted in FIG. 2). Further, in one or more embodiments, the visual confirmation is separate from the primary task.

Also, one or more embodiments include incorporating situational understanding in generating concept images of human poses using machine learning models. Such an embodiment includes extending the visual confirmation system in the machine teaching situation to propagate the understanding in one situation into another situation. In such an embodiment, the visual confirmation system not only confirms the pose or higher-order concept, but also generalizes the pose or higher-order concept to one or more other situations. In an example embodiment, the visual confirmation system, upon receiving human approval to update the model (such as depicted in FIG. 3, for instance) updates a graphical model and/or a knowledge graph with this new confirmed understanding of the scene. The graphical model and/or knowledge graph can then be used to infer anew relationship between other objects in the scene. For example, the machine teaching component can learn that cold and windy weather causes humans to shiver, and the update to the graphical model can reduce the chance of determining an action of flying a kite accordingly.

Figure 4:
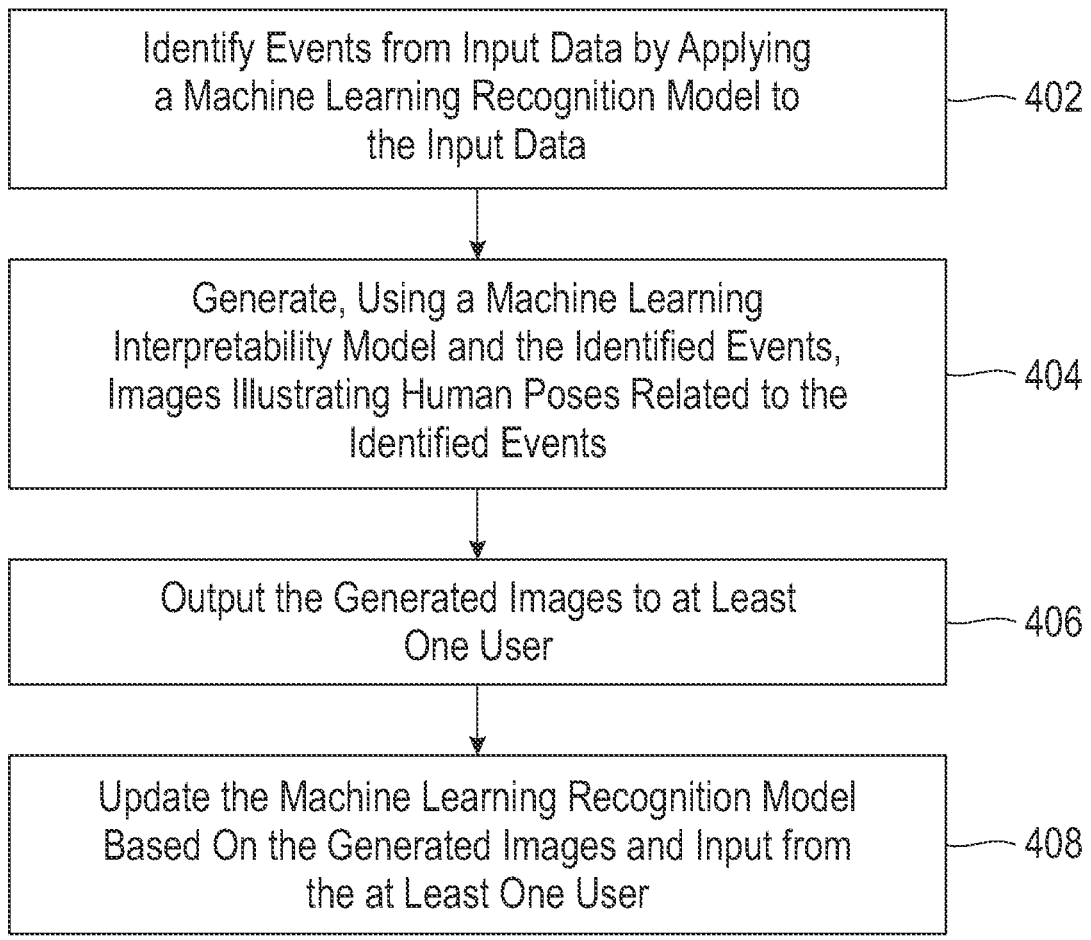
FIG. 4 is a flow diagram illustrating techniques according to an embodiment of the invention.

FIG. 4 is a flow diagram illustrating techniques according to an embodiment of the present invention. Step 402 includes identifying one or more events from input data by applying a machine learning recognition model to the input data, wherein identifying comprises (i) detecting multiple entities from the input data and (ii) determining one or more behavioral relationships among the multiple entities in the input data. The input data can include image data, text data, and/or multimodal data. At least one embodiment additionally includes training the machine learning recognition model using data pertaining to human pose structures and image texture information.

Step 404 includes generating, using a machine learning interpretability model and the identified events, one or more images illustrating one or more human poses related to the identified events. In at least one embodiment, the one or more images include one or more stick figure images.

Also, in one or more embodiments, identifying one or more events can include generating, via the machine learning recognition model, a vector representation of one or more human poses related to the identified events. In such an embodiment, generating the one or more images includes converting the vector representation to one or more human pose representations over one or more stick figure images.

Step 406 includes outputting the one or more generated images to at least one user. Step 408 includes updating the machine learning recognition model based at least in part on (i) the one or more generated images and (ii) input from the at least one user.

Also, an additional embodiment of the invention includes training a machine learning recognition model using data pertaining to human pose structures and image texture information, and identifying one or more events from input data by applying the machine learning recognition model to the input data, wherein the identifying comprises (i) detecting multiple entities from the input data and (ii) determining one or more behavioral relationships among the multiple entities in the input data. Such an embodiment also includes generating, using a machine learning interpretability model and the identified events, one or more images illustrating one or more human poses related to the identified events, and outputting, via a dialog system, the one or more generated images to at least one human user. Further, such an embodiment includes automatically producing at least one machine-originated image representative of the one or more generated images based at least in part on feedback from the at least one human user, and updating the machine learning recognition model based at least in part on the at least one machine-originated image.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
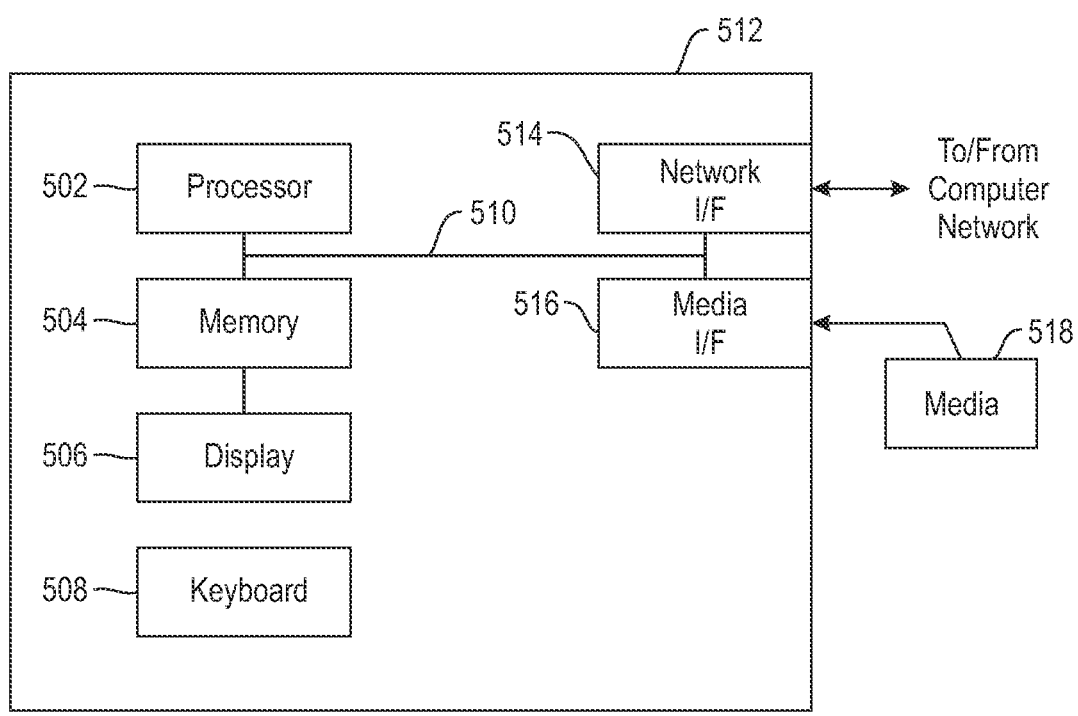
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening 1/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics Are As Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
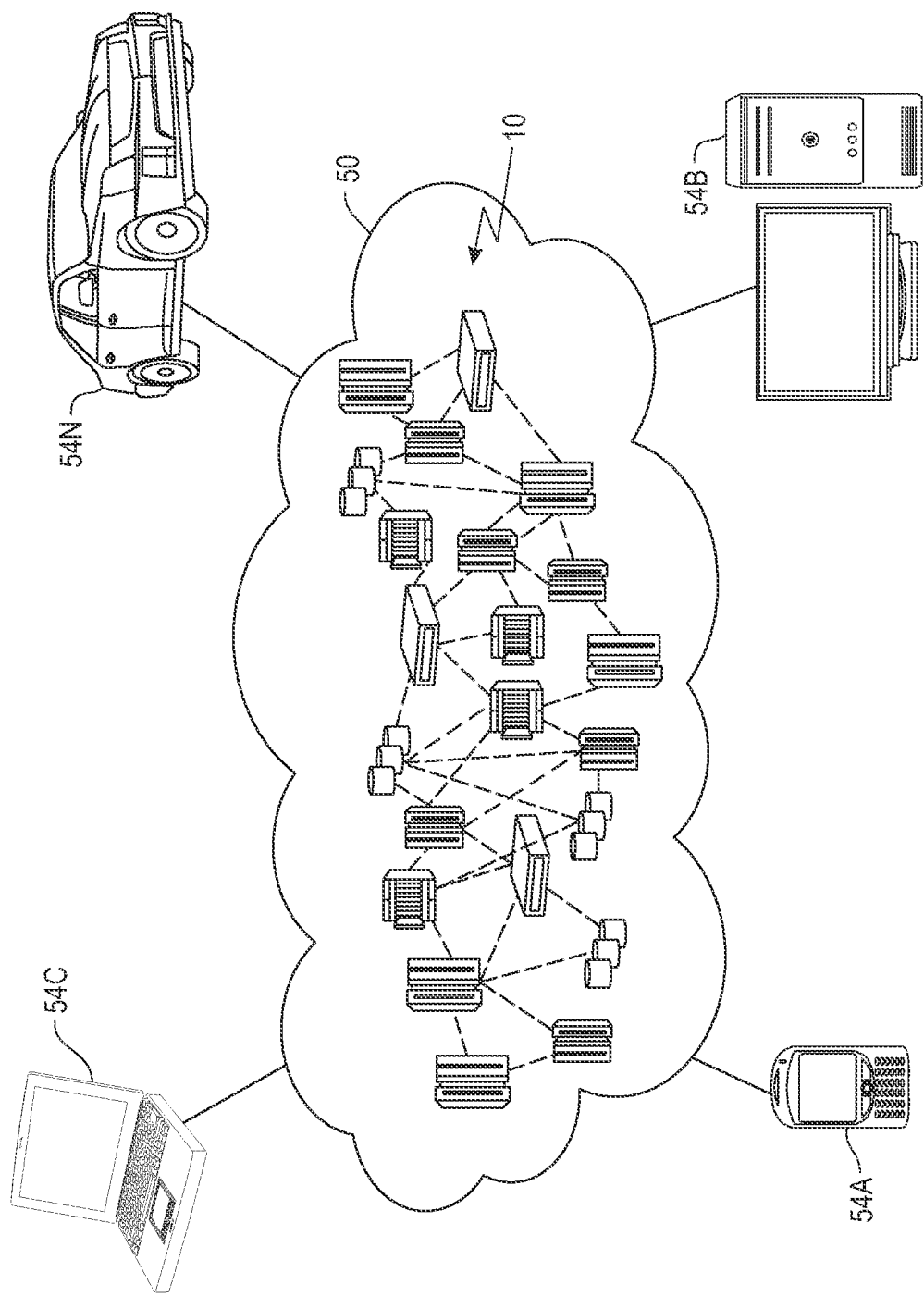
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private. Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
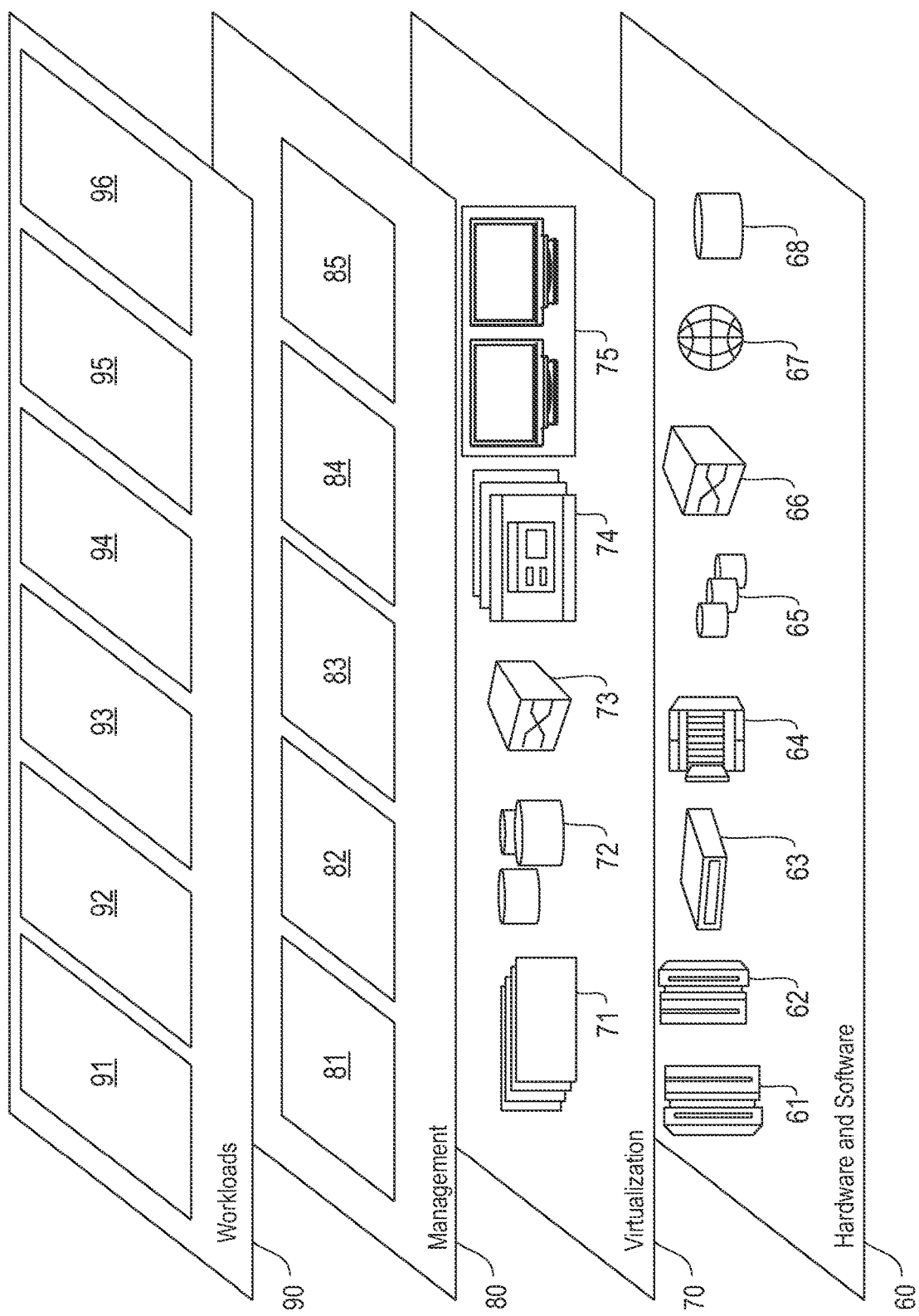
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and concept image generation 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, using a multimodal machine learning algorithm to learn a generalized concept of higher-order human behavior, and based at least thereon, generating one or more visual concept images as output.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    identifying one or more events from input data by applying a machine learning recognition model to at least a portion of the input data, wherein said identifying comprises (i) detecting multiple entities from the input data (ii) determining one or more behavioral relationships among at least a portion of the multiple entities, and (iii) generating, via the machine learning recognition model, a vector representation of one or more human poses related to at least a portion of the identified events;
    generating, using a machine learning interpretability model and at least a portion of the one or more identified events, one or more images illustrating one or more human poses related to the at least a portion of the one or more identified events, wherein said generating the one or more images comprises converting the vector representation to one or more human pose representations over one or more human form images;
    outputting at least a portion of the one or more generated images to at least one user; and
    updating the machine learning recognition model based at least in part on (i) at least a portion of the one or more generated images and (ii) input from the at least one user;
    wherein the method is carried out by at least one computing device.

2. The computer-implemented method of claim 1, comprising:
    training the machine learning recognition model using data pertaining to human pose structures and image texture information.

3. The computer-implemented method of claim 1, wherein the input data comprise image data.

4. The computer-implemented method of claim 1, wherein the input data comprise text data.

5. The computer-implemented method of claim 1, wherein the input data comprise multimodal data.

6. The computer-implemented method of claim 1, wherein the one or more images comprise one or more stick figure images.

7. A computer program product comprising a computer readable storage medium having program instructions embodied therewith, the program instructions executable by a computing device to cause the computing device to:
    identify one or more events from input data by applying a machine learning recognition model to at least a portion of the input data, wherein said identifying comprises (i) detecting multiple entities from the input data (ii) determining one or more behavioral relationships among at least a portion of the multiple entities, and (iii) generating, via the machine learning recognition model, a vector representation of one or more human poses related to at least a portion of the identified events;
    generate, using a machine learning interpretability model and at least a portion of the one or more identified events, one or more images illustrating one or more human poses related to the at least a portion of the one or more identified events, wherein said generating the one or more images comprises converting the vector representation to one or more human pose representations over one or more human form images;
    output at least a portion of the one or more generated images to at least one user; and
    update the machine learning recognition model based at least in part on (i) at least a portion of the one or more generated images and (ii) input from the at least one user.

8. The computer program product of claim 7, wherein the input data comprise image data.

9. The computer program product of claim 7, wherein the input data comprise text data.

10. The computer program product of claim 7, wherein the input data comprise multimodal data.

11. A system comprising:
    a memory; and
    at least one processor operably coupled to the memory and configured for:
        identifying one or more events from input data by applying a machine learning recognition model to at least a portion of the input data, wherein said identifying comprises (i) detecting multiple entities from the input data (ii) determining one or more behavioral relationships among at least a portion of the multiple entities, and (iii) generating, via the machine learning recognition model, a vector representation of one or more human poses related to at least a portion of the identified events;
        generating, using a machine learning interpretability model and at least a portion of the one or more identified events, one or more images illustrating one or more human poses related to the at least a portion of the one or more identified events, wherein said generating the one or more images comprises converting the vector representation to one or more human pose representations over one or more human form images;
        outputting at least a portion of the one or more generated images to at least one user; and
        updating the machine learning recognition model based at least in part on (i) at least a portion of the one or more generated images and (ii) input from the at least one user.

12. The system of claim 11, wherein the input data comprise image data.

13. The system of claim 11, wherein the input data comprise text data.

14. The system of claim 11, wherein the input data comprise multimodal data.

* * * * *